US012693465B2

(12) United States Patent
Kim et al.

(10) Patent No.: US 12,693,465 B2
(45) Date of Patent: Jul. 28, 2026

(54) POLARIZING FILM FOR 3D HUD AND DISPLAY DEVICE FOR 3D HUD INCLUDING THE SAME

(71) Applicant: SAMSUNG ELECTRONICS CO., LTD., Suwon-si (KR)

(72) Inventors: Chansu Kim, Seoul (KR); Yoonsun Choi, Yongin-si (KR); Byong Min Kang, Yongin-si (KR); Chansol Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 577 days.

(21) Appl. No.: 18/085,232

(22) Filed: Dec. 20, 2022

(65) Prior Publication Data

US 2023/0221476 A1 Jul. 13, 2023

(30) Foreign Application Priority Data

Jan. 13, 2022 (KR) ........................ 10-2022-0005327
Apr. 6, 2022 (KR) ........................ 10-2022-0042950

(51) Int. Cl.
*G02B 5/30* (2006.01)
*G02B 1/14* (2015.01)
*G02B 30/27* (2020.01)

(52) U.S. Cl.
CPC ............. *G02B 5/3033* (2013.01); *G02B 1/14* (2015.01); *G02B 30/27* (2020.01)

(58) Field of Classification Search
CPC .... G02B 1/14; G02B 5/3033; G02B 27/0101; G02B 30/27
See application file for complete search history.

(56) References Cited

U.S. PATENT DOCUMENTS

| | | | |
|---|---|---|---|
| 9,411,077 B2 | 8/2016 | Matsushima et al. | |
| 9,693,043 B2 | 6/2017 | Lin | |
| 10,007,039 B2 | 6/2018 | Aube | |
| 10,227,513 B2 | 3/2019 | Moon et al. | |
| 2006/0256259 A1* | 11/2006 | Takagi .................. | G02B 30/27 349/95 |
| 2009/0257003 A1 | 10/2009 | Yoshihara et al. | |
| 2015/0253478 A1 | 9/2015 | Aube | |
| 2015/0304639 A1 | 10/2015 | Lin | |

(Continued)

FOREIGN PATENT DOCUMENTS

| | | |
|---|---|---|
| CN | 107573893 A | 1/2018 |
| CN | 109581573 B | 12/2021 |

(Continued)

OTHER PUBLICATIONS

Communication issued Jun. 5, 2023 by the European Patent Office in counterpart European Patent Application No. 23150036.4.

(Continued)

*Primary Examiner* — Paisley L Wilson
(74) *Attorney, Agent, or Firm* — Sughrue Mion, PLLC

(57) ABSTRACT

Provided is a polarizing film for a three-dimensional (3D) head-up display (HUD) and a 3D HUD device including the polarizing film, in which the polarizing film includes a polarizer layer, a first protective layer on a first surface of the polarizer layer, and a second protective layer on a second surface of the polarizer layer opposite to the first surface.

13 Claims, 3 Drawing Sheets

1

(56) References Cited

U.S. PATENT DOCUMENTS

| | | | |
|---|---|---|---|
| 2016/0018566 A1 | 1/2016 | Matsushima et al. | |
| 2016/0122600 A1 | 5/2016 | Moon et al. | |
| 2017/0070727 A1 | 3/2017 | Chen | |
| 2017/0351105 A1 | 12/2017 | Cui et al. | |
| 2020/0166673 A1* | 5/2020 | Jo | B32B 27/306 |
| 2021/0278580 A1 | 9/2021 | Mashima et al. | |

FOREIGN PATENT DOCUMENTS

| | | | |
|---|---|---|---|
| JP | 7-56017 | A | 3/1995 |
| JP | 2012-68500 | A | 4/2012 |
| JP | 2021-96456 | A | 6/2021 |
| JP | 2021-144076 | A | 9/2021 |
| JP | 2021-173982 | A | 11/2021 |
| KR | 2003-0083518 | A | 10/2003 |
| KR | 10-2011-0110475 | A | 10/2011 |
| KR | 10-2014-0083409 | A | 7/2014 |
| KR | 10-1607965 | B1 | 3/2016 |
| KR | 10-2020-0017832 | A | 2/2020 |
| TW | 201416406 | A | 5/2014 |

OTHER PUBLICATIONS

Office Action dated Jul. 24, 2025, issued by European Patent Office in European Patent Application No. 23150036.4.

* cited by examiner

POLARIZING FILM FOR 3D HUD AND DISPLAY DEVICE FOR 3D HUD INCLUDING THE SAME

CROSS-REFERENCE TO RELATED APPLICATIONS

This application claims priority to Korean Patent Application No. 10-2022-0005327 filed on Jan. 13, 2022, and Korean Patent Application No. 10-2022-0042950 filed on Apr. 6, 2022, in the Korean Intellectual Property Office, the disclosures of which are incorporated herein by reference in their entireties.

BACKGROUND

1. Field

Example embodiments of the present disclosure relate to methods and apparatuses of a polarizing film for a three-dimensional (3D) head-up display (HUD) and a display device for a 3D HUD including the polarizing film.

2. Description of Related Art

One of the most dominant factors for recognizing a three-dimensional (3D) image may be a difference between images viewed by the eyes of a user. To show different images to the eyes of a user, a glass method and a glassless method may be used. The glass method may filter a desired image through polarization-based division, time-division, wavelength division with different wavelengths of primary colors, or the like. The glassless method may allow each image to be viewed in a specific space using a three dimensional (3D) conversion device such as a parallax barrier, a lenticular lens, a directional backlight unit (BLU), or the like. The glassless method may reduce the inconvenience a user may experience from wearing eyeglasses. In this case, a 3D image may be provided through an optical system such as a mirror, a lens, or the like. The optical system may change the direction of light, and thus a change in direction of light may need to be considered in 3D image rendering.

A head-up display (HUD) system may generate a virtual image in front of a driver and display information in the virtual image to provide various sets of information to the driver. The information provided to the driver may include instrument panel information including, for example, a vehicle speed, a remaining fuel amount, an engine revolution per minute (RPM), and navigation information. The driver may readily recognize the information displayed in front of the driver without a movement of a gaze while driving, and thus driving stability may be improved. In addition to the instrument panel information and the navigation information, the HUD system may also provide the driver with warning signs indicating lanes, constructions, traffic accidents, and pedestrians through an augmented reality (AR) method to assist the driver even in a poor view in front.

Implementation of three dimensions using a HUD may require precise eye-tracking and focusing methods for preventing moire patterns and crosstalk, and dimensional stability of a high-brightness liquid-crystal display (LCD) backlight unit (BLU) and lens.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

One or more example embodiments provide a polarizing film for a three-dimensional (3D) head-up display (HUD) device and a 3D HUD device including the polarizing film.

According to an aspect of an example embodiment, there is provided a polarizing film included in a three-dimensional (3D) head-up display (HUD), including a polarizer layer, a first protective layer on a first surface of the polarizer layer, and a second protective layer on a second surface of the polarizer layer opposite to the first surface.

The polarizer layer may include polyvinyl alcohol (PVA).

The polarizer layer may be formed using a uniaxially stretched PVA film.

A thickness of the polarizer layer may be 10 micrometers (μm) to 20 μm.

The polarizer layer may be deposited with an iodine dye.

The polarizer layer may further include at least one of a thermal stabilizer, an ultraviolet (UV) stabilizer, and an antioxidant.

The first protective layer may include at least one of tri-acetyl cellulose (TAC) and polymethyl methacrylate (PMMA).

A thickness of the first protective layer may be 30 μm to 50 μm.

The second protective layer may include at least one of PMMA, polycarbonate (PC), and cyclic olefin copolymer (COC).

A thickness of the second protective layer may be 20 μm to 40 μm.

A shrinkage rate of the polarizing film may be less than or equal to 0.15% in a transverse direction based on being at a temperature of 105° C. for 500 hours.

According to another aspect of an example embodiment, there is provided a display device included in a three-dimensional (3D) head-up display (HUD), including a transparent substrate, a polarizing film on the transparent substrate, and a lenticular lens on the polarizing film, wherein the polarizing film includes a polarizer layer, a first protective layer on a first surface of the polarizer layer, and a second protective layer on a second surface of the polarizer layer opposite to the first surface.

The first protective layer may include at least one of tri-acetyl cellulose (TAC) and polymethyl methacrylate (PMMA), wherein the second protective layer may include at least one of PMMA, polycarbonate (PC), and cyclic olefin copolymer (COC), wherein the first protective layer may be in contact with the lenticular lens, and wherein the second protective layer may be in contact with the transparent substrate.

A shrinkage rate of the lenticular lens may be less than or equal to 0.05% in a transverse direction based on being provided at a temperature of 105° C. for 500 hours.

A crosstalk less of the lenticular lens may be less than or equal to 2.0% based on being provided at a temperature of 105° C. for 500 hours.

According to another aspect of an example embodiment, there is provided a transportation device including a three-dimensional head-up display (3D HUD) including a display device, the display device including a transparent substrate, a polarizing film on the transparent substrate, and a lenticular lens on the polarizing film, wherein the polarizing film includes a polarizer layer, a first protective layer on a first surface of the polarizer layer, and a second protective layer on a second surface of the polarizer layer opposite to the first surface.

The first protective layer may include at least one of tri-acetyl cellulose (TAC) and polymethyl methacrylate (PMMA), wherein the second protective layer may include at least one of PMMA, polycarbonate (PC), and cyclic olefin copolymer (COC), wherein the first protective layer may be in contact with the lenticular lens, and wherein the second protective layer may be in contact with the transparent substrate.

A shrinkage rate of the lenticular lens may be less than or equal to 0.05% in a transverse direction based on being provided at a temperature of 105° C. for 500 hours.

A crosstalk less of the lenticular lens may be less than or equal to 2.0% based on being provided at a temperature of 105° C. for 500 hours.

A thickness of the polarizer layer may be 10 μm to 20 μm.

BRIEF DESCRIPTION OF THE DRAWINGS

The above and/or other aspects will be more apparent by describing example embodiments, taken in conjunction with the accompanying drawings, in which.

DETAILED DESCRIPTION

Figure 1:
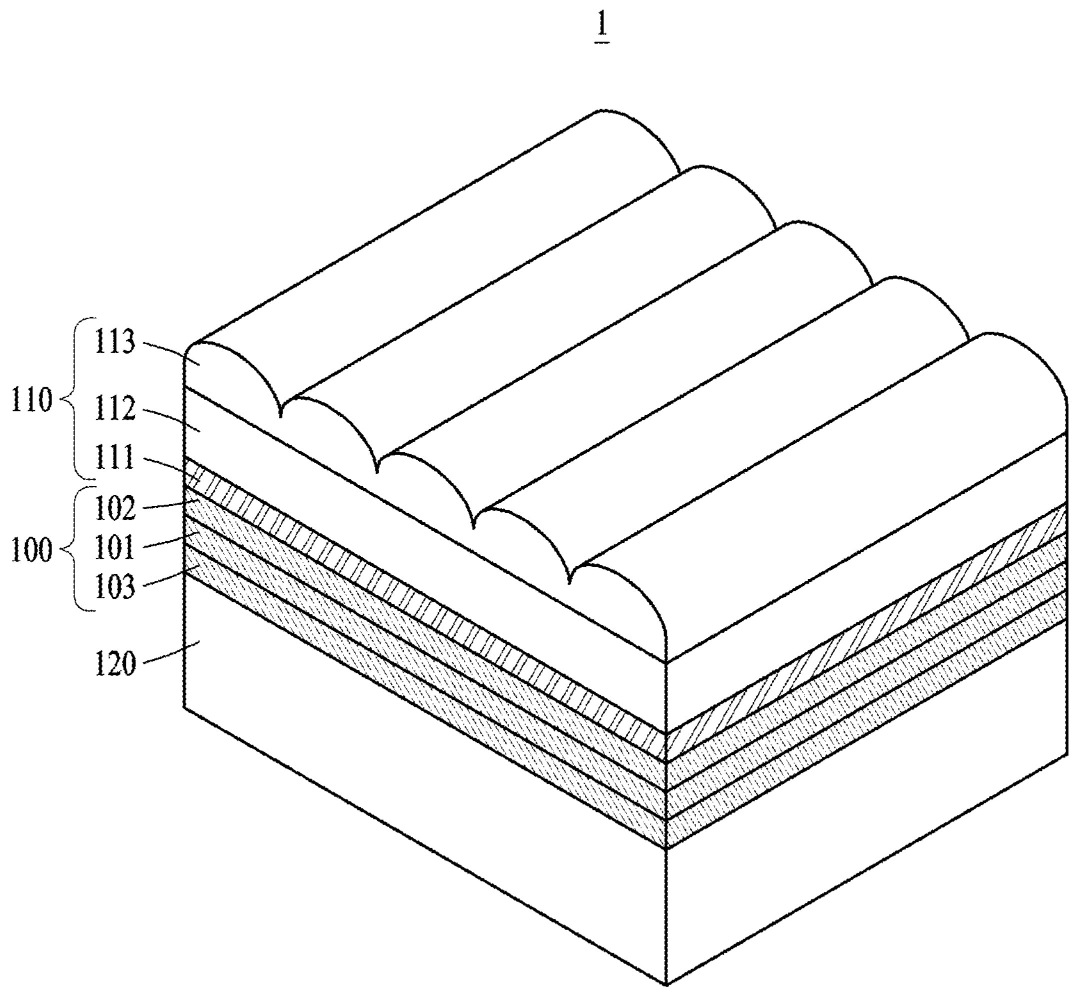
FIG. 1 is a perspective view of a display device for a three-dimensional (3D) head-up display (HUD) according to an example embodiment.

Reference will now be made in detail to example embodiments, examples of which are illustrated in the accompanying drawings, wherein like reference numerals refer to the like elements throughout.

The following structural or functional descriptions are exemplary to merely describe the example embodiments, and the scope of the example embodiments is not limited to the descriptions provided in the disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, example embodiments will be described in detail with reference to the accompanying drawings, and like reference numerals in the drawings refer to like elements throughout.

According to an example embodiment, there is provided a polarizing film for a three-dimensional (3D) head-up display (HUD). A glassless system and a glass system may be used to implement a 3D display, and as an example of the glassless system that does not require specially designed glasses to implement three dimensions, a lenticular lens may be used.

The lenticular lens may be a collective term referring to a lens formed with a plurality of convex lenticules on one surface and may be applied to a 3D display device to represent stereoscopic 3D information.

The lenticular lens may be applied to a transportation device (e.g., a vehicle), and may be used to provide a 3D HUD to a user. The transportation device may have a windshield facing a traveling direction that reflects light emitted from a 3D display device, allowing the HUD to be displayed. To represent the 3D HUD, visual information having a difference in information between a left eye and a right eye of the user may need to be provided.

The polarizing film may be provided to implement the 3D HUD and be manufactured as a plurality of layers that are stacked. The polarizing film may be applied to a display device for the 3D HUD to polarize light emitted from a backlight unit (BLU).

The polarizing film, which performs a function of allowing only light in one direction of the light emitted from the BLU to pass through, may directly adjust light emitted from a light source and may determine the characteristics and performance of the display device. The polarizing film may have a layer structure including a polarizer layer and protective layers that are stacked on both sides of the polarizer layer to protect the polarizer layer.

FIG. 1 is a perspective view of a display device for a 3D HUD according to an example embodiment.

Referring to FIG. 1, a display device 1 for a 3D HUD may include a transparent substrate 120, a polarizing film 100 formed on the transparent substrate 120, and a lenticular lens 110 formed on the polarizing film 100.

For various transportation device including, for example, a vehicle, there may be various situations including, for example, a drastic temperature change in the vehicle, exposure to direct light, and humidity conditions changing based on weather conditions such as rain and snow.

The display device 1 for a 3D HUD may be highly resistant to high temperature, high humidity, sunlight, and the like by an outdoor exposure to be provided in a transportation device and may thus be suitable for a transportation device.

The polarizing film 100 included in the display device 1 may include a plurality of layers. The polarizing film 100 may include a polarizer layer 101 to polarize light entering from a BLU in one direction. The light generated from the BLU may enter the polarizing film 100 through the transparent substrate 120 and may be polarized in one direction through the polarizer layer 101.

The polarizing film 100 may include the polarizer layer 101, a first protective layer 102 formed on one surface of the polarizer layer 101, and a second protective layer 103 formed on another surface of the polarizer layer 101. The second protective layer 103, the polarizer layer 101, and the first protective layer 102 may be provided in that order on the substrate 120.

The polarizer layer 101 may include polyvinyl alcohol (PVA). The polarizer layer 101 may be formed using a uniaxially stretched PVA film.

The thickness of the polarizer layer 101 may be 10 micrometers (μ) to 20 μm. For example, the thickness of the polarizer layer 101 may be 10 μm or greater, 11 μm or greater, 12 μm or greater, 13 μm or greater 14 μm or greater, 15 μm or greater, 16 μm or greater, 17 μm or greater, 18 μm or greater, or 19 μm or greater. The thickness of the polarizer layer 101 may be 20 μm or less, 19 μm or less, 18 μm or less, 17 μm or less, 16 μm or less, 15 μm or less, 14 μm or less, 13 μm or less, 12 μm or less, or 11 μm or less. The thickness of the polarizer layer 101 may be in a range between two values selected from the values described in the foregoing.

The thickness of the polarizer layer 101 may be between 10 μm and 20 μm. In this case, a polarization property may not be retained when the thickness of the polarizer layer 101 is less than 10 μm, and the polarizer layer 101 may considerably shrink and a crosstalk in a 3D image may increase when the thickness of the polarizer layer 101 is greater than 20 μm.

The polarizer layer 101 may be deposited with an iodine dye. The polarizer layer 101 may be uniaxially stretched, into which the iodine dye may be absorbed. As oriented in a direction in which the polarizer layer 101 is uniaxially stretched, the polarizer layer 101 may allow only light in a first direction to pass therethrough and absorb light other than light in the first direction. The iodine dye may further include potassium.

The polarizer layer 101 may further include at least one of a thermal stabilizer, an ultraviolet (UV) stabilizer, or an antioxidant. As an additional agent that may be further included in the polarizer layer 101, a thermal stabilizer, a UV stabilizer, and a antioxidant may be used.

The first protective layer 102 and the second protective layer 103 may be stacked on the polarizer layer 101 to protect the polarizer layer 101 and provide dimensional stability to the polarizing film 100.

The first protective layer 102 may include at least one of tri-acetyl cellulose (TAC) and polymethyl methacrylate (PMMA). The first protective layer 102 may include TAC. At least one material selected from TAC and PMMA included in the first protective layer 102 may have desirable transparency, smoothness, and optical isotropy.

The thickness of the first protective layer 102 may be 30 μm to 50 μm. The thickness of the first protective layer 102 may be 30 μm or greater, 31 μm or greater, 32 μm or greater, 33 μm or greater, 34 μm or greater, 35 μm or greater, 36 μm or greater, 37 μm or greater, 38 μm or greater, 39 μm or greater, 40 μm or greater, 41 μm or greater, 42 μm or greater, 43 μm or greater, 44 μm or greater, 45 μm or greater, 46 μm or greater, 47 μm or greater, 48 μm or greater, or 49 μm or greater. In addition, the thickness of the first protective layer 102 may be 50 μm or less, 49 μm or less, 48 μm or less, 47 μm or less, 46 μm or less, 45 μm or less, 44 μm or less, 43 μm or less, 42 μm or less, 41 μm or less, 40 μm or less, 39 μm or less, 38 μm or less, 37 μm or less, 36 μm or less, 35 μm or less, 34 μm or less, 33 μm or less, 32 μm or less, or 31 μm or less. The thickness of the first protective layer 102 may be in a range between two values selected from the values described in the foregoing.

The thickness of the first protective layer 102 may be between 30 μm and 50 μm. In this case, when the thickness of the first protective layer 102 is less than 30 μm a protective property of the first protective layer 102 may not be fully exhibited due to an extremely thin thickness, and the first protective layer 102 may considerably shrink at a high temperature when the thickness of the first protective layer 102 is greater than 50 μm.

The second protective layer 103 may include at least one polymer selected from PMMA, polycarbonate (PC), and cyclic olefin copolymer (COC). The second protective layer 103 may include a material having relatively low hygroscopicity and water permeability. At least one material selected from PMMA, PC, and COC included in the second protective layer 103 may have desirable transparency, smoothness, and optical isotropy.

The COC may be represented by chemical formula 1 below, wherein, X and Y are positive integers.

[Chemical formula 1]

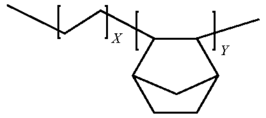

The thickness of the second protective layer 103 may be 20 μm to 30 μm. The thickness of the second protective layer 103 may be 20 μm or greater, 21 μm or greater, 22 μm or greater, 23 μm or greater, 24 μm or greater, 25 μm or greater, 26 μm or greater, 27 μm or greater, 28 μm or greater, 29 μm or greater, 30 μm or greater, 31 μm or greater, 32 μm or greater, 33 μm or greater, 34 μm or greater, 35 μm or greater, 36 μm or greater, 37 μm or greater, 38 μm or greater, or 39 μm or greater. In addition, the thickness of the second protective layer 103 may be 40 μm or less, 39 μm or less, 38 μm or less, 37 μm or less, 36 μm or less, 35 μm or less, 34 μm or less, 33 μm or less, 32 μm or less, 31 μm or less, 30 μm or less, 29 μm or less, 28 μm or less, 27 μm or less, 26 μm or less, 25 μm or less, 24 μm or less, 23 μm or less, 22 μm or less, or 21 μm or less. The thickness of the second protective layer 103 may be in a range between two values selected from the values described in the foregoing.

The thickness of the second protective layer 103 may be between 20 μm and 40 μm. In this case, when the thickness of the second protective layer 103 is less than 20 μm a protective property of the second protective layer 103 may not be fully exhibited due to an extremely thin thickness, and the second protective layer 103 may considerably shrink at a high temperature when the thickness of the second protective layer 103 is greater than 40 μm.

The polarizing film 100 may have a shrinkage rate of 0.15% or less in a transverse direction (TD) after being provided at a temperature of 105° C. for 500 hours. In this case, the shrinkage rate may be measured by comparing a distance between two points on the polarizing film 100 before the polarizing film 100 is provided at a temperature of 105° C. for 500 hours and a distance between the two points after the polarizing film 100 is provided at a temperature of 105° C. for 500 hours. The polarizing film 100 may have a shrinkage rate measured in a machine direction (MD) which is a stretching direction of the polarizer layer 101 and a shrinkage rate measured in the TD that is perpendicular to the MD. The polarizing film 100 may have a shrinkage rate of 0.15% or less in the TD (or a width direction) that is perpendicularly stretched direction of the polarizer layer 101, after being provided at the temperature of 105° C. for 500 hours. The polarizing film 100 may have a shrinkage rate of 0.13% or less in the TD (or the width direction) after being provided at the temperature of 105° C. for 500 hours.

According to another example embodiment, a display device 1 for a 3D HUD may include a transparent substrate 120, a polarizing film 100 formed on the transparent substrate 120, and a lenticular lens 110 formed on the polarizing film 100. The polarizing film 100 may include a polarizer layer 101, a first protective layer 102 formed on one surface of the polarizer layer 101, and a second protective layer 103 formed on another surface of the polarizer layer 101.

The first protective layer 102 may include at least one selected of TAC and PMMA, and the second protective layer 103 may include at least one polymer selected from PMMA, PC, and COC. In this case, the first protective layer 102 may be disposed to be in contact with the lenticular lens 110, and the second protective layer 103 may be disposed to be in contact with the transparent substrate 120. Due to characteristics of a 3D display device, a direction of the lenticular lens 110 that is exposed to sunlight may experience a more extreme change in temperature, and the first protective layer 102 that is thicker may be formed to be in contact with the lenticular lens 110.

The lenticular lens 110 may include an adhesive layer 111, a base substrate 112 formed on the adhesive layer 111, and a patterned layer 113 formed on the base substrate 112.

The lenticular lens 110 may be formed by forming the patterned layer 113 on one surface of the base substrate 112 and then forming the adhesive layer 111 on another surface of the patterned layer 113. The adhesive layer 111 may be provided between the first protective layer 102 and the base substrate 112. However, embodiments are not limited thereto, and the lenticular lens 110 may be formed by forming first the adhesive layer 111 on the base substrate 112 and then forming the patterned layer 113 on the other surface.

The patterned layer 113 may be formed by applying an acrylic polymer on the base substrate 112 with a uniform thickness through slot-die coating, roll coating, or bar coating, curing it under ultraviolet light, and imprinting it to have a pattern.

The patterned layer 113 may have the pattern formed by applying the acrylic polymer on the base substrate 112, and the pattern may be formed after the acrylic polymer is applied with a thickness of 10 μm to 100 μm.

The base substrate 112 may include polyethylene terephthalate (PET).

The base substrate 112 may include uniaxially stretched PET.

Using such a uniaxially stretched film for the base substrate 112 may result in a more desirable optical property compared to using a biaxially stretched film.

Since the biaxially stretched PET has optical anisotropy, a phase delay may occur differently according to a position of the base substrate 112 when linearly polarized light passes through, and the light may be changed to circularly polarized light or elliptically polarized light, which may degrade the brightness of an image. In contrast, the uniaxially stretched PET may have a constant phase difference, and a phase delay may be constantly maintained regardless of a position of the base substrate 112.

The lenticular lens 10 may be formed such that a difference between an MD of the PET included in the base substrate 112 and a polarization direction of a polarizing film layer to be attachable to the lenticular lens 110 becomes less than or equal to 5 degrees (°).

The base substrate 112 may have an optical retardation value of 7000 nm or greater at a wavelength of 50 nm.

A relationship between an optical retardation value $R_e$ and a luminance I may be represented by Equation 1 below.

$$I/I_o = \frac{1}{2}\sin^2\left(\pi\frac{Re}{\lambda}\right) \quad \text{[Equation 1]}$$

In response to a specific optical retardation value $R_e$, a luminance I may be represented in the form of a sine function, and the specific optical retardation value $R_e$ may be calculated as a product of a refractive index deviation, a wavelength, and a thickness of a film. $I_o$ denotes an incident light luminance.

When the specific optical retardation value $R_e$ is relatively low, a wavelength with a relatively low luminance and a wavelength with a relatively high luminance may occur alternately in a visible light area, and a great luminance deviation and chromatic dispersion may thereby occur. When the specific optical retardation value $R_e$ is greater than or equal to 7000 nm, a luminance may be evenly exhibited in wavelengths in all areas and the chromatic dispersion may thus be removed.

An optical retardation value at a wavelength of 550 nm may be greater than or equal to 8000 nm, or greater than or equal to 10000 nm.

The base substrate 112 may have a shrinkage rate of 0.1% or less in a TD (or a width direction) when being provided for 500 hours under the condition of a moisture permeability being 100 g/m$^2$·day or less and a relative humidity being 93% at a temperature of 63° C.

The base substrate 112 may have uniform performance irrespective of a temperature because the film does not readily absorb water under a high humidity condition, in particular.

The patterned layer 113 may include at least one acrylic polymer selected from ethyl (meth)acrylate, n-propyl (meth) acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth) acrylate, isooctyl (meth)acrylate, isononyl (meth)acrylate, lauryl (meth)acrylate, and tetradecyl (meth)acrylate.

The patterned layer 113 may further include ethylene oxide and urethane acrylate.

As the patterned layer 113 further includes ethylene oxide and urethane acrylate, it may be more adhesive to the base substrate 112.

The patterned layer 113 may be formed by applying the acrylic polymer on the base substrate 112.

The patterned layer 113 may have a pattern formed by applying the acrylic polymer on the base substrate 112, and then performing photocuring and imprinting using a mold.

The patterned layer 113 may include a cross-sectionally semicircular pattern.

The patterned layer 113 may include a plurality of cross-sectionally semicircular patterns, which may be used to separate left and right images.

The patterned layer 113 may include a plurality of lenticules.

The pattern of the patterned layer 113 may include a plurality of semicylindrical lenticules, and an arrangement direction of the lenticular lens 110 may be slanted by 10° to 15° with respect to a normal vertical direction.

The arrangement direction of the lenticular lens 110 may be determined by measuring an angle formed between a longitudinal direction of the lenticules and a normal of one corner of the lenticular lens 110 when being viewed from an upper surface of the lenticular lens 110.

The patterned layer 113 may be slanted by the angle of 10° to 15° counterclockwise to the vertical direction and be slanted by approximately 12°.

When the angle by which the patterned layer 113 is slanted is 15° or greater, moiré may increase and a resolution of a 3D image may be degraded. In contrast, when the angle by which the patterned layer 113 is slanted is 10° or less, moiré may increase and image quality may be degraded due to a visible black matrix.

The pattern of the patterned layer 113 may have a pitch of 60 μm to 150 μm and a height of 3 μm to 20 μm.

The pattern of the patterned layer 113 may be formed by imprinting a portion of the acrylic polymer.

The pattern of the patterned layer 113 may have the pitch of 60 μm to 100 μm.

The patterned layer 113 may have a refractive index of 1.45 to 1.60, 92% or greater transmittance of light having a wavelength of 550 nm, and a haze of 2% or less.

The patterned layer 113 may include at least one initiator selected from a polyfunctional phenol compound, an amine compound, an imidazole compound, an acid anhydride, an organophosphorus compound and halide, a polyfunctional acrylic compound, a urethane compound, an isocyanate compound, an alcohol compound, polyamide, polysulfide, and boron trifluoride.

The patterned layer 113 may be formed by applying the acrylic polymer on the base substrate 112 and curing it through photocuring, and the initiator may be included for the photocuring.

The pattern of the patterned layer 113 may be formed through imprinting using molding.

The patterned layer 113 may include an aromatic monomer in an amount of 20 wt % or less.

The aromatic monomer may be discolored by heat and UV, and it may thus be desirable to include a relatively small amount of the aromatic monomer to prevent discoloration.

The patterned layer 113 may include the aromatic monomer in an amount of 5 wt % or less, or 3 wt % or less.

The adhesive layer 111 may have a thickness of 10 μm to 30 μm.

Figure 2:
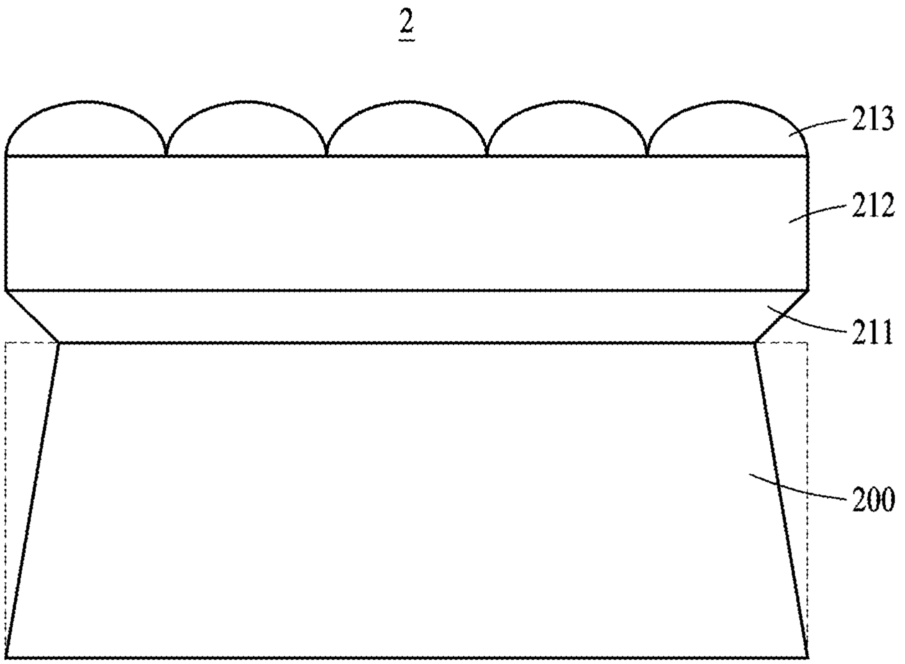
FIG. 2 is a cross-sectional view of a display device for a 3D HUD according to an example embodiment.

FIG. 2 is a cross-sectional view of a display device for a 3D HUD according to an example embodiment.

Referring to FIG. 2, a display device 2 for a 3D HUD may shrink by an external stimulus such as a long-time exposure to high temperature or direct sunlight, and particularly a polarizing film 200 (e.g., the polarizing film 100 of FIG. 1) and an adhesive layer 211 (e.g., the adhesive lens 111 of FIG. 1) of a lenticular lens may shrink considerably. Such shrinkage may not be desirable due to characteristics of the display device 2 for a 3D HUD that may need to provide separated visual information to left and right eyes, and thus the shrinkage may need to be minimized.

As the polarizing film 200 is thin and the shrinkage is maximally suppressed, an amount of intersection of 3D images for the left and right eyes may be minimized, a rainbow blotch may not occur, and a value of a phase difference by an incident angle of light may not change.

An overlap of a left image and a right image output from the lenticular lens may be represented by calculating a crosstalk (or X-talk, %). Light $I_{sub\ pixel}$ emitted from a sub-pixel may be defined (as represented by Equation 2 below) by a sum of a luminance $I_{left}$ of the left image, a luminance $I_{right}$ of the right image, and a luminance $I_{stray\ light}$ that is lost by unnecessary reflection and scattering, and the crosstalk may be defined (as represented by Equation 3 below) by a rate of an image that does not contribute to the actual 3D image.

$$I_{sub\ pixel}=I_{left}+I_{right}+I_{stray\ light} \quad \text{[Equation 2]}$$

$$X\text{-talk}[\%]=I_{stray\ light}/(I_{left}+I_{right})\times 100 \quad \text{[Equation 3]}$$

For example, the crosstalk may be 2.0% or less when the lenticular lens (e.g., the lenticular lens 110 of FIG. 1) is provided at a temperature of 105° C. for 500 hours.

Table 1 below illustrates values obtained by measuring crosstalk by shrinkage of the lenticular lens (e.g., the lenticular lens 110 of FIG. 1).

TABLE 1

| | | | | |
|---|---|---|---|---|
| Lens shrinkage rate (Direction: TD) | 0.01% | 0.03% | 0.05% | 0.1% |
| Crosstalk | 0.05% | 1% | 2% | 5% |

Referring to Table 1, as a shrinkage rate of the lenticular lens increases, the crosstalk may increase exponentially. To have a 2% or less crosstalk, the lens shrinkage rate may be desirably 0.05% or less.

In addition, there may be a relationship between a crosstalk and a TD shrinkage rate of the polarizing film. Table 2 below illustrates values obtained by measuring a crosstalk by shrinkage of the polarizing film (e.g., the polarizing film 100 of FIG. 1).

TABLE 2

| | | | | |
|---|---|---|---|---|
| Shrinkage rate of polarizing film (Direction: TD) | 0.1% | 0.15% | 0.2% | 0.5% |
| Lens shrinkage rate (Direction: TD) | 0.03% | 0.05% | 0.07% | 0.10% |
| Crosstalk | 1% | 2% | 3% | 10% |

Referring to Table 2, as a TD shrinkage rate of the polarizing film increases, a TD shrinkage rate of the lenticular lens may increase. To have a 2% or less crosstalk, the TD shrinkage rate of the polarizing film may be 0.15% or less.

The display device (e.g., the display device 1 for a 3D HUD of FIG. 1) may be provided in a means of transportation to implement a 3D HUD.

Hereinafter, examples and comparative examples will be provided for a detailed description of example embodiments of the present disclosure.

However, the examples to be described hereinafter may be provided merely for illustrative purposes, but not be provided to limit the example embodiments.

A PVA polarizer layer was prepared. The polarizer layer is a uniaxially stretched PVA film, and is immersed in potassium/iodine solution to have a polarization property. A polarizing film with a total of three layers was prepared by attaching a first protective layer (with a thickness of approximately 40 μm) on the polarizer layer and attaching a second protective layer (with a thickness of approximately 32 μm) under the polarizer layer. The polarizing film was prepared in a rectangular form (with a diagonal length of 3.9 inches) with a width of 92 millimeters (mm) and a length of 49.32 mm, and an align key was marked at each of four vertices for future measurement of a shrinkage rate. Table 3 below illustrates materials and thicknesses of the polarizer layer, the first protective layer, and the second protective layer.

TABLE 3

| Classification | Example 1 | Example 2 | Example 3 | Related example 1 | Related example 2 | Related example 3 | Related example 4 |
|---|---|---|---|---|---|---|---|
| Material and thickness of polarizer layer | PVA 10 μm | PVA 16 μm | PVA 20 μm | PVA 25 μm | PVA 16 μm | PVA 20 μm | PVA 30 μm |
| Material and thickness of first protective layer | TAC 40 μm | TAC 40 μm | TAC 40 μm | TAC 40 μm | TAC 40 μm | TAC 40 μm | TAC 40 μm |
| Material and thickness of second protective layer | PMMA 30 μm | PMMA 30 μm | PMMA 30 μm | PMMA 30 μm | TAC 40 μm | TAC 40 μm | TAC 40 μm |

A shrinkage rate of the polarizing film prepared according to the preparation example was measured. The shrinkage rate was measured by measuring a length deformed after the film is provided at a temperature of 105° C. for 500 hours, using the align key marked at each of the four vertices by an optical microscope in a unit of 0.01 μm.

After being provided at a high temperature of 105° C. for 500 hours, which is a condition generally required for vehicles, TD shrinkage rates of polarizing films of Examples 1, 2, 3, and Related example 1 were measured, and shrinkage rates according to the thicknesses of polarizer layers of the examples were compared.

TABLE 4

| Classification | Example 1 | Example 2 | Example 3 | Related example 1 |
|---|---|---|---|---|
| TD shrinkage rate of polarizing film | 0.08% | 0.11% | 0.15% | 0.20% |

Referring to Table 4 above, it is verified that a 20 μm or less thickness of the PVA polarizer layer may be desirable.

In addition, the shrinkage rates were measured after the polarizing films of Examples 2 and 3, and Related examples 2, 3, and 4 were provided in a humid environment. In detail, such a test was performed under the condition that the films were provided for 500 hours in an environment of 90 RH % at 60° C.

TABLE 5

| Classification | Example 2 | Example 3 | Related Example 2 | Related Example 3 | Related Example 4 |
|---|---|---|---|---|---|
| TD shrinkage rate of polarizing film | 0.08% | 0.10% | 0.12% | 0.15% | 0.17% |

Referring to Table 5, it is verified that, unlike the polarizing films of the related examples, the polarizing films of the examples using, for a second protective layer, a PMMA material which has relatively less moisture absorption than a TAC material have reduced shrinkage rates. When prepared using the PMMA material, the polarizer layers may be protected by a protective layer of a thinner thickness compared to when the TAC material is used. However, using the PMMA material for an upper protective layer may not be desirable because discoloration is likely to occur due to UV.

A display device for a 3D HUD was prepared by coupling a first protective layer and a lenticular lens of a polarizing film (which was prepared as described above and coupling a second protective layer) and a transparent glass substrate of the polarizing film. The display device was prepared in the form of an overall rectangular parallelepiped by preparing the lenticular lens and the glass substrate to have a rectangular form (with a diagonal length of 3.9 inches) with a width of 92.00 mm and a length of 49.32 mm.

Figure 3:
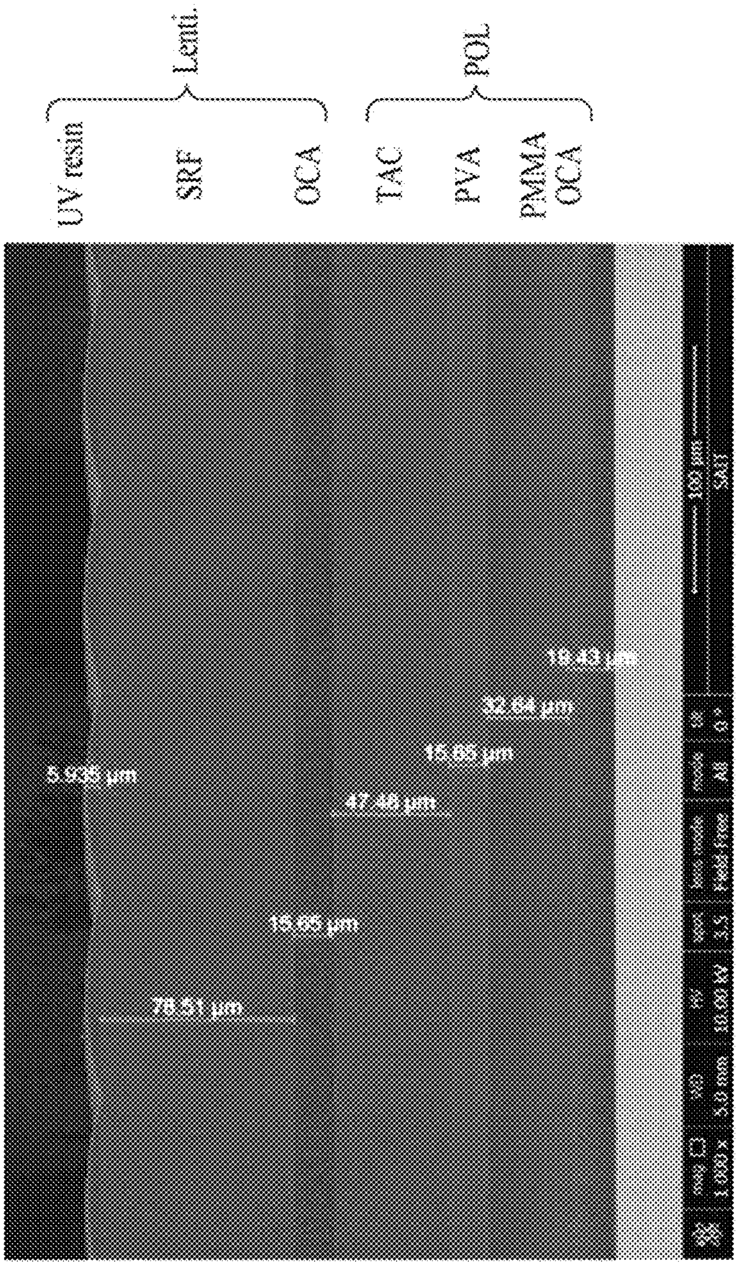
FIG. 3 is a cross-sectional scanning electron microscope (SEM) image of a display device for a 3D HUD according to an example embodiment.

FIG. 3 is a cross-sectional scanning electron microscope (SEM) image of a display device for a 3D HUD according to an example embodiment.

Referring to FIG. 3, it is verified that the thickness of a PVA film which is a polarizer layer is considerably thin.

While the present disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A polarizing film included in a three-dimensional (3D) head-up display (HUD), comprising:

a polarizer layer;

a first protective layer on a first surface of the polarizer layer; and a second protective layer on a second surface of the polarizer layer opposite to the first surface, wherein a shrinkage rate of the polarizing film being less than or equal to 0.15% in a transverse direction based on being at a temperature of 105° C. for 500 hours, wherein the first protective layer and the second protective layer comprise polymethyl methacrylate (PMMA), wherein a thickness of the polarizer layer is 10 micrometers (μm) to 20 μm, and wherein a crosstalk of the lenticular lens is less than or equal to 2.0% based on being provided at a temperature of 105° C. for 500 hours.

2. The polarizing film of claim 1, wherein the polarizer layer comprises polyvinyl alcohol (PVA).

3. The polarizing film of claim 1, wherein the polarizer layer is formed using a uniaxially stretched PVA film.

4. The polarizing film of claim 1, wherein the polarizer layer is deposited with an iodine dye.

5. The polarizing film of claim 1, wherein the polarizer layer further comprises at least one of a thermal stabilizer, an ultraviolet (UV) stabilizer, and an antioxidant.

6. The polarizing film of claim 1, wherein the first protective layer further comprises tri-acetyl cellulose (TAC).

7. The polarizing film of claim 1, wherein a thickness of the first protective layer is 30 μm to 50 μm.

8. The polarizing film of claim 1, wherein the second protective layer further comprises at least one of polycarbonate (PC) and cyclic olefin copolymer (COC).

9. The polarizing film of claim 1, wherein a thickness of the second protective layer is 20 μm to 40 μm.

10. A display device included in a three-dimensional (3D) head-up display (HUD), comprising:

a transparent substrate;

a polarizing film on the transparent substrate; and a lenticular lens on the polarizing film, wherein the polarizing film comprises:

a polarizer layer;

a first protective layer on a first surface of the polarizer layer; and a second protective layer on a second surface of the polarizer layer opposite to the first surface, wherein the first protective layer and the second protective layer comprise polymethyl methacrylate (PMMA), wherein the lenticular lens comprises:

an adhesive layer;

a base substrate on the adhesive layer; and a patterned layer on the base substrate opposite to the adhesive layer, wherein a shrinkage rate of the polarizing film being less than or equal to 0.15% in a transverse direction based on being at a temperature of 105° C. for 500 hours, wherein a thickness of the polarizer layer is 10 micrometers (μm) to 20 μm, wherein a shrinkage rate of the lenticular lens is less than or equal to 0.05% in a transverse direction based on being provided at a temperature of 105° C. for 500 hours, and wherein a crosstalk of the lenticular lens is less than or equal to 2.0% based on being provided at a temperature of 105° C. for 500 hours.

11. The display device of claim 10, wherein the first protective layer further comprises tri-acetyl cellulose (TAC), wherein the second protective layer further comprises at least one of polycarbonate (PC) and cyclic olefin copolymer (COC), wherein the first protective layer is in contact with the lenticular lens, and wherein the second protective layer is in contact with the transparent substrate.

12. A transportation device comprising:

a three-dimensional (3D) head-up display (HUD) comprising a display device, the display device comprising:

a transparent substrate;

a polarizing film on the transparent substrate; and a lenticular lens on the polarizing film, wherein the polarizing film comprises:

a polarizer layer;

a first protective layer on a first surface of the polarizer layer; and a second protective layer on a second surface of the polarizer layer opposite to the first surface, wherein the first protective layer and the second protective layer comprise polymethyl methacrylate (PMMA), wherein the lenticular lens comprises:

an adhesive layer;

a base substrate on the adhesive layer; and a patterned layer on the base substrate opposite to the adhesive layer, wherein a shrinkage rate of the polarizing film being less than or equal to 0.15% in a transverse direction based on being at a temperature of 105° C. for 500 hours, wherein a thickness of the polarizer layer is 10 micrometers (μm) to 20 μm, wherein a shrinkage rate of the lenticular lens is less than or equal to 0.05% in a transverse direction based on being provided at a temperature of 105° C. for 500 hours, and wherein a crosstalk of the lenticular lens is less than or equal to 2.0% based on being provided at a temperature of 105° C. for 500 hours.

13. The transportation device of claim 12, wherein the first protective layer further comprises tri-acetyl cellulose (TAC), wherein the second protective layer further comprises at least one of polycarbonate (PC) and cyclic olefin copolymer (COC), wherein the first protective layer is in contact with the lenticular lens, and wherein the second protective layer is in contact with the transparent substrate.

* * * * *